March 21, 1933. A. H. TYRER 1,902,200
DEVICE FOR IMPREGNATING DRINKING WATER WITH RADIUM EMANATION
Filed Dec. 2, 1926
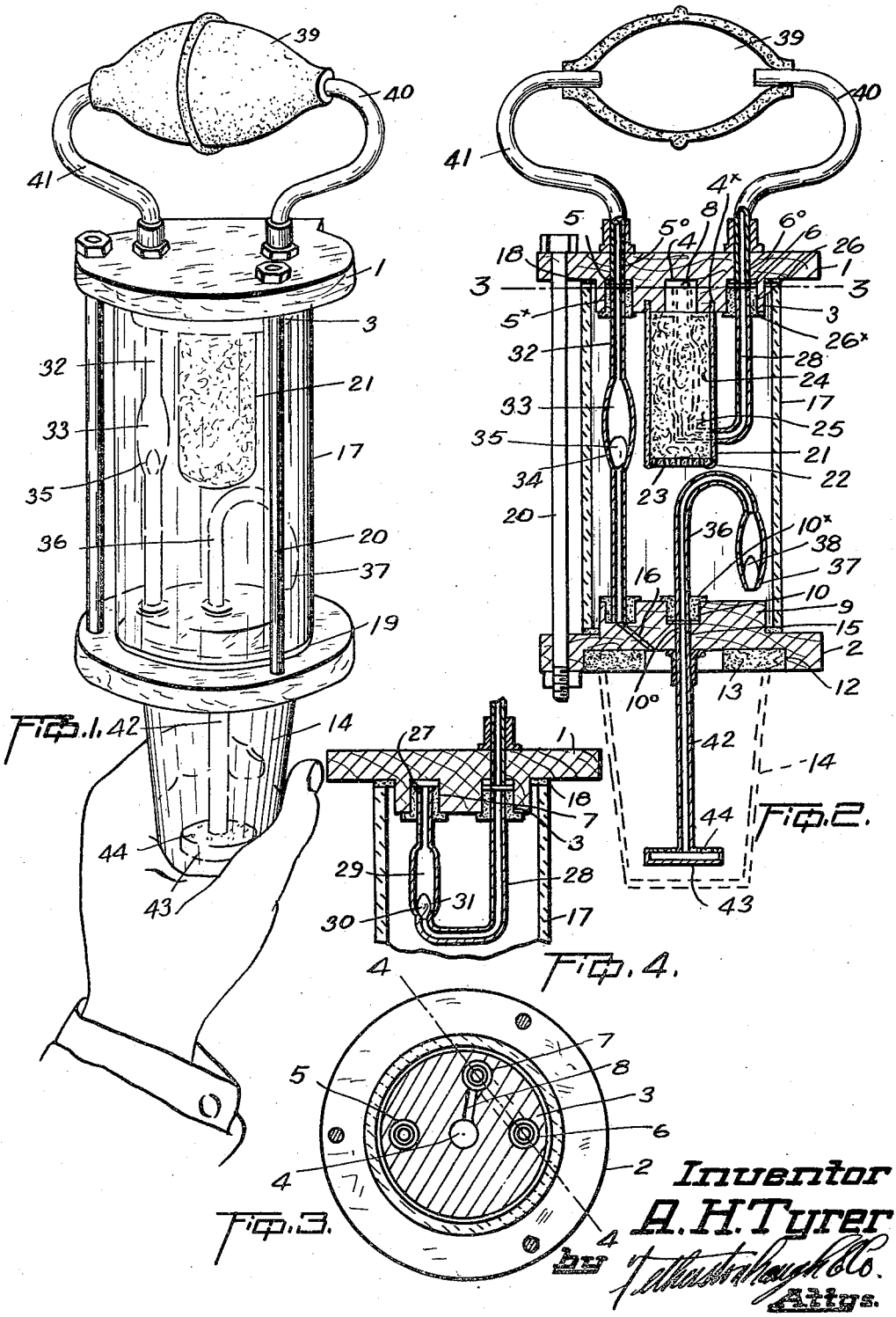
Inventor
A. H. Tyrer Patented Mar. 21, 1933

1,902,200

UNITED STATES PATENT OFFICE

ALFRED HENRY TYRER, OF TORONTO, ONTARIO, CANADA, ASSIGNOR TO STANDARD RADIUM CORPORATION OF AMERICA, OF NEW YORK, N. Y., A CORPORATION OF DELAWARE

DEVICE FOR IMPREGNATING DRINKING WATER WITH RADIUM EMANATION

Application filed December 2, 1926. Serial No. 152,201.

My invention relates to improvements in devices for impregnating drinking water with radium emanation, and the object of the invention is to devise a simple compact device easily operated, whereby drinking water contained in a tumbler or other suitable receptacle may be quickly charged or aerated with radium-carrying air, and it consists essentially of the arrangement and construction of parts as hereinafter more particularly explained.

Fig. 1 is a perspective view of my device shown with the tumbler held and applied thereto.

Fig. 2 is a sectional view through Figure 1 showing the tumbler in the applied position by dotted lines.

Fig. 3 is a sectional view on line 3—3 Figure 2.

Fig. 4 is a sectional view on line 4—4 Figure 3.

In the drawing like characters of reference indicate corresponding parts in each figure.

1 and 2 are two heads preferably formed of wood, the head 1 being provided with a reduced central depending portion 3 provided with a central recess 4 surrounded concentrically by an annular groove $4^x$. Similar recesses 5 and 6 are located in diametrical alignment at each side of the central orifice 4 and a recess 7 connected by a horizontal duct 8 with the central recess 4. The head 2 is provided on its upper face with a reduced extension 9 having a central recess 10 and a recess 11 located in vertical alignment with the recesses 5 of the head 1. The lower face of the head 2 is provided with a circular recess 12 in which is located and suitably secured an annular washer 13 of soft rubber such as sponge rubber and against which the upper edge of the tumbler 14 is pressed so as to sink into the surface of the rubber as indicated by dotted lines in Figure 2 and thereby form a sealed joint.

15 is an orifice extending between the centre of the recess 10 and the recess 12. 16 is a duct extending from the centre of the recess 11 and inclining inward to the centre portion of the recess 12 within the inner periphery of the annular washer 13. 17 is a cylinder which is preferably formed of glass and extending between the heads 1 and 2 and at its end surrounding the extensions 3 and 9 of such heads. 18 and 19 are rubber gaskets fitting between the ends of the cylinder 17 and the heads 1 and 2 and extending around the head extensions 3 and 9. 20 are draw bolts whereby the heads 1 and 2 are secured together so as to tightly grip the cylinder 17 therebetween and thereby form an air tight chamber or reservoir for radium charged air as will hereinafter appear.

21 is a cylinder which is also preferably formed of glass and which forms the radium container, the upper end edge of the cylinder extending into the groove $4^x$ and being suitably secured therein. The lower edge of the cylinder 21 is preferably drawn inward as indicated at 22 to form retaining means for a perforated end plate 23.

24 is a filling of fibrous material such as asbestos in which the particles of radium are contained, a further packing of fibrous material 25 being located at the bottom of the cylinder over the perforated plate 23 so as to prevent the particles of radium being carried out through the perforations with the air flow. 26 is a cork plug fitting into the orifice 6 and provided with a central orifice $26^x$. 27 is a similar rubber plug fitting in the orifice 7. 28 is a glass tube which is bent substantially into U-form, one arm of the U extending into the central orifice of the plug 26 and the other arm of the U into the central orifice of the plug 27 as clearly indicated in Figure 4. The arm of the U 28 fitting into the plug 27 is provided with an enlargement 29 forming a valve seat 30 with which a non-return valve 31 formed of glass or other suitable material coacts so as to prevent the return of air forced through the pipe 28 as will hereinafter appear.

The orifices 5 and 11 are also provided with cork plugs $5^x$ and $11^x$ having central orifices into which extend the ends of a vertical tube 32 having an enlargement 33 intermediate of its length forming a valve seat 34 with which a non-return valve 35 coacts. The recess 10 is provided with a cork plug $10^x$ having a central orifice in which fits the lower end of a tube 36, the upper end of the tube being bent over in semi-circular form, the depending portion being enlarged to form a valve seat 37 at its lower end with which a non-return valve 38 coacts.

39 is a compressible bulb set in a diametric position horizontally over the head 1, and 40 and 41 are pipes bent at their upper ends in a horizontal direction so as to enter the ends of the bulb as clearly shown in Figure 2, the lower ends of the tube being curved inward towards each other and then downward so as to extend through orifice 5° and 6° in central alignment with the upper ends of the tube 28 extending into the orifice 26 and the upper end of the tube 32 extending into the orifice 5.

The head 2 is also provided with a central orifice 10° in central alignment with the recess 10 and in which is secured a depending tube 42 provided at its lower end with a circular hollow head 43 having a perforated top 44.

When the bulb 39 is compressed air is forced through the tube 40, tube 27, lifting the valve 31 so as to permit the air to pass upward into the orifice 7 and from thence through the duct 8 into the central orifice 4 passing downward therefrom through the radium container formed by the cylinder 25 picking up the radium emanation as it passes therethrough and then passing through the perforations of the plate 23 and into the cylinder 17 forming a reservoir for radium charged air and simultaneously by the compression of the bulb 39 the radium charged air from the cylinder 17 lifts the valve 38 so that such air passes through the tube 36 and downward through the tube 42 into the head 43 being forced upward through the perforations 44 into the bottom of the body of water contained in the tumbler 14 which has been previously set in position with its upper edge pressed against the washer 13 as above described. During this operation the air pressure created by the compression of the bulb 39 also passes through the tube 41 forcing the valve 35 to its closed position. When the bulb 39 is released and the pressure through the tube 40 relieved the valves 31 and 38 close and the valve 35 is drawn open creating a suction through the tube 41 and tube 32 past the open valve 35 and through the duct 16 so as to draw off from the tumbler 14 any surplus of radium charged air which is not absorbed by the water contained in the tumbler 14, such surplus air being drawn upward into the bulb 39 and is forced upon the recompression of the bulb down the tube 40 and into the cylinder 17 thereby preventing any wastage.

From this description it will be seen that I have devised a very simple device whereby a glass of water can be quickly and easily charged with radium charged air simply by pressing the tumbler 14 into position against the washer 13 and then compressing and releasing the bulb 39 as above described.

What I claim as my invention is:

1. A device for impregnating drinking water with radium emanation comprising a reservoir, a radium container having a perforated portion located in the reservoir, a duct leading into the radium container, a return duct leading through the bottom of the reservoir and having an open end adapted to be covered by the open top of the water containing vessel, a bulb adapted when compressed to force air through the aforesaid duct into the water containing receptacle and when expanded to draw the surplus radium charged air from the water receptacle through said return duct, a tube extending through the bottom head of the reservoir and through which the radium charged air is forced, and a hollow head at the lower end of the tube having a perforated top adapted to be submerged in a body of water contained in a drinking vessel, a resilient washer secured to the lower face of the bottom head of the reservoir and extending around the depending tube against which the upper edge of the drinking vessel is adapted to be forced.

2. A device for impregnating drinking water with radium emanation comprising a cylindrical reservoir having an upper and lower head, a radium container depending from the upper head and having a perforated portion, an orifice extending through the head, a recess formed in the lower face of the head, a U-shaped tube, one arm of which extends into said orifice and the other into the recess, a non-return valve adapted to be opened by pressure extending through the tube from the orifice end thereof, a duct leading from the recess into the radium container, and a compressible bulb for creating a current of air through the U-shaped tube, duct and radium container into the reservoir, a discharge tube depending from the lower head of the reservoir, and means for simultaneously forcing radium charged air through the discharge tube into a body of water contained in the vessel in which the lower end of the discharge tube is submerged.

3. A device for impregnating beverage liquid with radium emanation comprising an air chamber, a second chamber for radio active material, radio active material therein, an outlet from said second chamber into said air chamber whereby the enclosed air is exposed to emanations from said radio active material, a horizontal face plate carried by said air chamber, and adapted to receive and seal the mouth of a drinking vessel, an inlet conduit passing through said face plate and air chamber, an outlet conduit passing through the second chamber and said face plate and extending into said air chamber, means for circulating the air in said chamber through liquid contained in a drinking vessel, when said vessel is applied to said face plate, in a position covering the exposed ends of said inlet and outlet conduits, and valves adapted to close said inlet and outlet conduits in the absence of liquid to be impregnated.

4. A device for impregnating beverage liquid with radium emanation comprising in combination an air chamber of relatively large capacity a separate enclosed container for radio active material having an outlet into said air chamber, a liquid containing vessel of relatively small capacity, a face plate external to said air chamber adapted to receive and seal the mouth of said liquid container, an inlet conduit passing through said face plate and air chamber, an outlet conduit passing through said face plate and extending into said air chamber, means for circulating the air in said chamber through said container and said inlet and outlet conduits and through a body of liquid in said liquid container, and valve means adapted to close said inlet and outlet conduits independently of the presence of liquid in said liquid container.

5. A device for impregnating drinking water with radium emanation comprising a reservoir, a radium container having a perforated portion located in the reservoir, a duct leading into the radium container, a return duct leading through the bottom of the reservoir and having an open end adapted to be covered by the open top of the water containing vessel, a bulb adapted when compressed to force air through the aforesaid duct into the water containing receptacle and when expanded to draw the surplus radium charged air from the water receptacle, through said return duct, a tube extending through a bottom wall of the reservoir and through which the radium charged air is forced, said tube having its outer end submerged in the water containing vessel, said bottom wall presenting a surface extending around the extending tube and against which the upper edge of the water containing vessel may be placed.

6. A device for impregnating drinking water with radium emanation comprising a reservoir having an upper and lower head, a radium container depending from the upper head and communicating with the interior of the reservoir, an orifice extending through the head, a recess formed in the lower face of the head, a tube having one end extending into said orifice and the other into the recess, a non-return valve adapted to be opened by pressure extending through the tube from the orifice end thereof, a duct leading from the recess into the radium container, means for forcing air through said tube, duct and radium container into the reservoir, a discharge tube depending from the lower head of the reservoir, said forcing means also being effective to force radium charged air through the discharge tube into a body of water contained in the vessel in which the lower end of the discharge tube is submerged, and means establishing communication between the vessel and said forcing means.

7. A device for impregnating beverage liquid with emanation from radio-active material comprising an air chamber, a receptacle containing radio-active material, an outlet from said receptacle into said air chamber, said chamber having a wall adapted for engagement with the mouth of a drinking vessel, an inlet conduit passing through said wall and air chamber, an outlet conduit passing through said wall and extending into said air chamber, means for circulating the air in said chamber through the receptacle and liquid contained in the drinking vessel, when said vessel is applied to said wall in a position covering the exposed ends of said inlet and outlet conduits, and valves adapted to close said inlet and outlet conduits in the absence of liquid to be impregnated.

8. A device for impregnating beverage liquid with emanation from radio-active material, comprising in combination an air chamber, a separate enclosed receptacle containing radio-active material, said receptacle having an outlet into said air chamber, said chamber having a wall adapted for engagement with the mouth of said vessel, an inlet conduit passing through said wall and air chamber, an outlet conduit passing through said wall and extending into said air chamber, means for circulating the air in said chamber through said inlet and outlet conduits and through said receptacle and a body of liquid in said vessel, when the vessel is applied to said wall in a position covering the exposed ends of said conduits, and valve means operative to close said inlet and outlet conduits independently of the presence of liquid in said liquid container.

9. A device for impregnating drinking water with radio-active emanation comprising a reservoir, a radium container having a perforated portion located in the reservoir, a duct leading into the radium container, a return duct leading through the bottom of the reservoir and having an open end positioned to be covered by the open top of a water containing vessel, a bulb communicating with said ducts and effective when compressed to force air through the first duct into the water containing receptacle and when expanded to draw the surplus radium charged air from the receptacle through said return duct, a tube extending through the bottom of the reservoir and into which the radium charged air is forced, and a hollow head at the lower end of the tube having a perforated top positioned for submergence in a body of water contained in the water containing vessel, and means for forming an air tight seal between the upper edge of the vessel and the bottom of the reservoir.

10. A device for impregnating drinking water with radio-active emanation comprising a reservoir, a radium container having a perforated portion located in the reservoir, a duct leading into the radium container, a return duct leading through the bottom of the reservoir and having an open end positioned to be covered by the open top of a water containing vessel, a bulb communicating with said ducts and effective when compressed to force air through the first duct into the water containing receptacle and when expanded to draw the surplus radium charged air from the receptacle through said return duct, a tube extending through the bottom of the reservoir and through which the radium charged air is forced, said tube projecting beyond the bottom of the reservoir a distance sufficient to permit submergence thereof in a body of water contained in the water containing vessel, said bottom presenting a wall surface surrounding the tube and engageable with the upper edge of the vessel.

11. A device for impregnating drinking water with radium emanation comprising a reservoir, a radium container in the reservoir and opening thereinto, a bulb located above the reservoir, a valved duct extending from one end of the bulb into the radium container, the valve of which is adapted to open under the influence of pressure exerted upon the bulb, and a valved duct extending from the opposite end of the bulb through the bottom of the reservoir, the open end of which is positioned to be covered by a vessel containing drinking water and the valve of which is adapted to open by suction produced by removal of pressure upon the bulb and means also operable under the influence of pressure of the bulb for conducting air from the reservoir into the body of water contained in the vessel, whereby a substantially continuous circulation of air through the radium container and water may be obtained by compressing and de-compressing the bulb.

12. A device for impregnating drinking water with radium emanation comprising a reservoir, a radium container in the reservoir and opening thereinto, a bulb located above the reservoir, a valved duct extending from one end of the bulb into the radium container, the valve of which is adapted to open under the influence of pressure exerted upon the bulb, and a valved duct extending from the opposite end of the bulb through the bottom of the reservoir, the open end of which is positioned to be covered by a vessel containing drinking water and the valve of which is adapted to open by suction produced by removal of pressure upon the bulb, and means including a valved duct extending from the interior of the reservoir to a point exteriorly thereof, and having an end adapted for positioning in the body of water contained in the vessel, said means being operable under the influence of pressure on the bulb for conducting air from the reservoir into the body of water contained in the vessel, whereby a substantially continuous circulation of air through the radium container and water may be obtained by compressing and de-compressing the bulb.

13. A device for impregnating drinking water with radium emanation comprising a reservoir provided with upper and lower heads, a radium container depending from the head within the reservoir and having a perforated bottom, a compressible bulb, a duct extending from one end of the bulb through the upper head of the reservoir into the radium container, a valve in said duct operable by the pressure resulting from compression of the bulb, a discharge tube extending through the bottom of the reservoir, a non-return valve therefor also operable by the pressure resulting from compression of the bulb, a duct extending through the lower head of the reservoir and having an open end positioned to be covered by a vessel containing drinking water, said duct extending upwardly through the other head of the reservoir to the opposite end of the bulb, a valve therein operable by suction produced by decompression of the bulb, and said discharge tube being effective to carry air from the reservoir into the body of water, to a point adjacent the bottom of the vessel.

ALFRED HENRY TYRER.